United States Patent [19]

Bendig et al.

[11] 4,116,882

[45] Sep. 26, 1978

[54] METHOD FOR THE FORMATION OF ALUMINA SPHERES

[75] Inventors: Larry L. Bendig; Cathy S. Siemsen; Donald E. Stowell, all of Ponca City, Okla.

[73] Assignee: Continental Oil Company, Ponca City, Okla.

[21] Appl. No.: 860,369

[22] Filed: Dec. 14, 1977

[51] Int. Cl.² .............................................. B01J 21/04
[52] U.S. Cl. .................................... 252/448; 252/463; 423/626
[58] Field of Search ................ 252/448, 463; 423/626, 423/628

[56] References Cited

U.S. PATENT DOCUMENTS

| 2,435,379 | 2/1948 | Archibald | 252/448 |
| 2,532,497 | 12/1950 | Hoekstra | 252/448 |

*Primary Examiner*—W. J. Shine
*Attorney, Agent, or Firm*—Cortlan R. Schupbach, Jr.

[57] ABSTRACT

Alumina spheres are formed by peptizing alumina slurries, centrifugates, and filtercakes, aging and dropping the peptized material through a hydrocarbon filled column. The improved method avoids the drying and reslurrying of alumina powders currently used and provides a method whereby harmful ions such as chloride and sulfates can be excluded from the alumina.

5 Claims, No Drawings

METHOD FOR THE FORMATION OF ALUMINA SPHERES

This invention relates to an improved method for forming alumina spheres. More particularly, this invention relates to an improved method for forming alumina spheres by eliminating the currently practiced drying and reslurrying steps while providing an alumina sphere with improved activity by excluding ions such as chloride and sulfate which are undesirable to many catalytic uses.

Formation of alumina spheres by dropping an alumina sol through a hydrocarbon filled column is known and has been practiced for several years. Many references abound in this area but the art can be adequately represented by several U.S. Patents. U.S. Pat. No. 2,620,314 which teaches mixing an alumina sol with a weak base such as hexamethylene tetramine, dropping through a hydrocarbon bath and aging the materials. U.S. Pat. No. 3,346,336 eliminates the use of a gelling agent (such as an aqueous ammonia phase) by adding an acetic $Al_2O_3$ hydrosol to an equal volume of an alkali metal hydroxide, then passing through a hydrocarbon filled column to obtain sphereoids. The hydrosol was prepared by dissolving aluminum metal in concentrated hydrochloric acid which leaves chlorine ions in the alumina at the end of the process. Another such process is taught in U.S. Pat. No. 3,027,234.

U.S. Pat. No. 3,096,295 uses hexamethylene tetramine to set the hydrogel. Other references use chlorine or sulfate ion for processing purposes which remain in the alumina and are unsatisfactory for many catalytic uses. Examples of such references are U.S. Pat. Nos. 3,027,234; 3,600,129; 3,943,071. U.S. Pat. No. 3,979,334 teaches using a chemical containing an ammonia precursor to eliminate the need for an aqueous ammonia phase to age the spheres.

Thus it can be seen that it would be very desirable to provide a method whereby alumina spheres could be produced with less processing yet provide improved alumina spheres containing no detrimental ions.

It is therefore an object of the instant invention to provide an improved process for producing alumina spheres while reducing the number of undesirable ions in the finished spheres. Other objects will become apparent to those skilled in this art as the description proceeds.

It has now been discovered than an improved method for forming alumina spheres is obtained by dropping an alumina slurry through a hydrocarbon filled column to form spheres, said column having an aqueous ammonia layer at the lower portion thereof, allowing the formed spheres to remain in contact with the aqueous ammonia for a period of time sufficient for the spheres to maintain spherical form is provided. The improvement comprises forming alumina spheres having from 80 to 85% of the pore volume in the range of from about 35 angstroms to about 65 angstroms, by peptizing alumina slurry containing from 10 to 20 weight percent $Al_2O_3$ prior to dropping through the column. The agent used to peptize the slurry is preferably nitric or acetic acid, thus no drying or reslurrying of the alumina is necessary and detrimental ions are not present in the finished product. At the conclusion of the recovery and drying of the spheres, the spheres can be calcined to convert the alumina to the gamma form.

It is preferred that the alumina used in the practice of the instant invention be that derived from the hydrolysis of aluminum alkoxides although it is well known that alumina from other sources can be used.

Aluminum alkoxides suitable for use in the method of the present invention are those aluminum alkoxides wherein the alkoxy groups contain from 2 to 30 carbon atoms each. Suitable aluminum alkoxides are produced by processes such as the Ziegler process. The preparation of such aluminum alkoxides is well known to those skilled in this art. For example, in many instances the aluminum alkoxides are produced for the purpose of producing alumina or alcohols. In any event it is desirable that the alcohols be recovered as such since they constitute a valuable coproduct of the reaction. Some suitable alkoxide mixtures such as those produced by the Ziegler process may contain minor amounts of alkoxy groups containing less than four carbon atoms. Alcohols produced by the Ziegler process will contain only alkoxy groups having an even number of carbon atoms.

Such aluminum alkoxides are then contacted with an excess of water to form alumina and alcohols containing 2 to 30 carbon atoms. The alumina is a solid largely immiscible in water and precipitates, thereby facilitating recovery. The alcohols are readily separated by decanting and the like. If desired, organic diluents can be used in order to more readily separate the recovered alcohols from the precipitated alumina.

The alumina is then normally steam stripped to remove any alcohol impurities. Normally, at this point, the alumina is dried and reduced to a convenient size before reslurrying, forming hydrogels, and dropping through a hydrocarbon filled column.

In the process of the instant invention, the slurry is then filtered to make a filtercake which is approximately 15½% $Al_2O_3$ by weight. This filtercake or slurry, depending upon the level of water present, is peptized by adding about 2 milliliters (ml) of an acid (selected from the group consisting of formic, acetic, nitric, or other suitable peptizing agent without detrimental ions) to 125 grams of filtercake. The filtercake then becomes a slurry with a high alumina content. The slurry is allowed to age for approximately 30 minutes (or until the slurry viscosity thickens to about 400 centipoise). The slurry is then dropped through a spherodizing column which has a suitable hydrocarbon such as Naphtha, $C_5C_{12}$ paraffins, benzene, etc. as an upper phase and about a 5–15 weight percent $NH_3$ solution in water as a lower phase. The spheres are allowed to age for a half hour in the ammonia solution at the bottom of the hydrocarbon column after which they are removed, dried overnight at about 250° F. and calcined for a desired period of time. Calcination at 900° F. or higher converts alumina to gamma phase. Pore diameter of between 35 and 65 angstroms can be achieved by having a calcination at 900° F. for 3 hours. As is known to those skilled in this art, higher temperatures allow pore sizes to increase.

Normal aging time in the ammonia solution can range from about 10 minutes to about 1 hour, with 25 to 35 minutes being preferred. After recovery from the ammonia free water must be removed. Normally this is done by drying at less than about 250° F. for sufficient time to remove the water. Calcination is carried out at temperatures of from about 900° to about 1500° F. for a period of time sufficient to yield the desired overage pore diameter.

The hydrocarbon filled column containing aqueous ammonia at the bottom desirably provides surfactant in the ammonia phase to lower interfacial tension between the hydrocarbon and the aqueous ammonia phases. Representative examples of such surfactants are the ethoxylates of $C_{10}$ to $C_{14}$ alcohols, although other nonionic surfactants containing no inorganic ions detrimental to the final catalyst can be used.

The slurry which is dropped through the hydrocarbon filled column after being peptized has properties generally produced by adding from 1 to 8% by weight based on $Al_2O_3$ of the acid to the filtercake. The slurry prior to dropping will have a viscosity of from about 200 to about 600 centipoise, preferably 200 to about 400 centipoise. The weight percent alumina of the slurry will range from about 10 to about 20%. Preferably, the concentration of the aqueous ammonia solution will be around 10%.

Spheres formed by the process of the instant invention will thus be more easily made while containing no detrimental organic ions.

The invention is more concretely described with reference to the example below wherein all parts and percentages are by weight unless otherwise specified. The example is intended to exemplify the instant invention and not to limit it.

EXAMPLE

An alumina slurry from the hydrolysis of aluminum alkoxides is extracted and steam stripped to remove alcohol impurities. The slurry is filtered to make a filtercake containing about 15.5% $Al_2O_3$ by weight. Glacial acetic acid (2 ml) is added to 125 grams of filtercake which becomes a slurry with a high alumina content. The slurry is allowed to age approximately 30 minutes, the viscosity thickening to about 400 centipoise. The slurry is then dropped through a spherodizing column which has naphtha for an upper phase and 10% $NH_3$ in water for a lower phase. The spheres are allowed to age for ½ hour in the ammonia solution at the bottom of the column after which they are removed, dried overnight at 250° F., and calcined for 1 hour at 1000° F. The final product had the following average crush strength and pore volume distribution in cubic centimeters per gram.

| Average Crush - > 35 lbs Pore Volume Distribution, cc/gm | | |
|---|---|---|
| 0–50Å | — | 0.44 |
| 0–100Å | — | 0.47 |
| 0–200Å | — | 0.48 |
| 0–500Å | — | 0.48 |
| 0–1000Å | — | 0.48 |
| 0–10,000Å | — | 0.48 |

The viscosity of the filtercake is lowered drastically when acid is added and the mixture is placed under shear. Size of spheres produced is determined by parameters well-known in the art, e.g. opening of nozzle, slurry viscosity and surface tension etc. Sphere size is important, since the larger spheres have a higher crush strength, but smaller spheres are generally more desirable for reaction rate.

While certain embodiments and details have been shown for the purpose of illustrating this invention, it will be apparent to those skilled in this art that various changes and modifications may be made herein without departing from the spirit or the scope of the invention.

We claim:

1. An improved method for forming high purity alumina spheres by dropping alumina slurry through a hydrocarbon filled column to form spheres said column having an aqueous ammonia layer at the lower portion thereof, said ammonia providing a set to the spheres allowing them to maintain spherical form, the improvement comprising forming alumina spheres having from 80–85% of the pore volume of said spheres in the range of from about 35 angstroms to about 65 angstroms, by peptizing an alumina slurry obtained from the hydrolysis of aluminum alkoxides, said slurry containing from 10 to 20 weight percent $Al_2O_3$, with an acid selected from a group such as acetic acid, formic acid, and nitric acid and allowing the slurry thus formed to age until a viscosity of from about 200 to about 600 centipoise is obtained, prior to dropping through a hydrocarbon filled column.

2. A method as described in claim 1 wherein the recovered spheres are calcined to convert the alumina to the gamma form.

3. A method as described in claim 1 wherein the aqueous ammonia contains surfactants.

4. A method as described in claim 3 wherein the surfactants are selected from the group consisting of ethoxylates of $C_{10}$ to $C_{14}$ alcohols.

5. A method as described in claim 3 wherein the slurry formed has a viscosity of from about 200 to about 600 centipoise and a percentage alumina content of from about 10 to about 20% containing from about 1 to 8% acid based upon the $Al_2O_3$ content.

* * * * *